(12) United States Patent
Yamaguchi et al.

(10) Patent No.: US 7,904,928 B2
(45) Date of Patent: Mar. 8, 2011

(54) CONTENT DELIVERY SYSTEM, CONTENT DELIVERY APPARATUS, CONTENT RECORDING AND REPRODUCTION APPARATUS AND CONTENT RECORDING AND REPRODUCTION METHOD, AND COMPUTER PROGRAM

(75) Inventors: Hiroshi Yamaguchi, Chiba (JP); Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 977 days.

(21) Appl. No.: 10/520,684

(22) PCT Filed: Apr. 19, 2004

(86) PCT No.: PCT/JP2004/005560
§ 371 (c)(1),
(2), (4) Date: Jan. 6, 2005

(87) PCT Pub. No.: WO2004/100547
PCT Pub. Date: Nov. 18, 2004

(65) Prior Publication Data
US 2005/0268323 A1   Dec. 1, 2005

(30) Foreign Application Priority Data

May 9, 2003  (JP) .............................. P2003-132260

(51) Int. Cl.
*H04N 7/20* (2006.01)
*H04N 7/173* (2006.01)
*H04N 7/16* (2006.01)
(52) U.S. Cl. ............ 725/64; 725/111; 725/113; 725/153
(58) Field of Classification Search .................... 725/64, 725/111, 133, 153
See application file for complete search history.

(56) References Cited

U.S. PATENT DOCUMENTS

| 6,343,319 | B1 * | 1/2002 | Abensour et al. | 709/219 |
| 6,769,128 | B1 * | 7/2004 | Knee et al. | 725/43 |
| 6,816,967 | B1 * | 11/2004 | Iijima et al. | 713/164 |
| 7,065,213 | B2 * | 6/2006 | Pinder | 380/240 |
| 7,305,357 | B2 * | 12/2007 | Hamilton | 705/27 |
| 7,548,984 | B2 * | 6/2009 | Kurauchi | 709/231 |
| 2002/0042923 | A1 * | 4/2002 | Asmussen et al. | 725/92 |
| 2003/0088768 | A1 * | 5/2003 | Challener | 713/163 |

FOREIGN PATENT DOCUMENTS

| EP | 0 763 936 A1 | 3/1997 |
| EP | 1 130 915 A2 | 9/2001 |
| JP | 11-003559 | 1/1999 |

(Continued)

*Primary Examiner* — Christopher Kelley
*Assistant Examiner* — Franklin S Andramuno
(74) *Attorney, Agent, or Firm* — Lerner, David, Littenberg, Krumholz & Mentlik, LLP

(57) ABSTRACT

The invention relates to properly protecting broadcast contents stored on a receiver side from copying without permission and illegal use in server type broadcasting. According to the invention, contents are sent from a broadcast sending side in a state in which copyright information for the contents is added to the contents. On the other hand, on a receiving client side applicable to server type digital broadcasting, it is possible to perform appropriate control for reproduction of contents and recording reservation on the basis of copyright information for contents such as the number of times of reproduction of contents, restriction of display resolution at the time of reproduction of contents, and an expiration date of content reproduction. According to this copyright information, it is possible to perform detailed control for a display device incorporated in or connected to a receiver.

16 Claims, 4 Drawing Sheets

FOREIGN PATENT DOCUMENTS

| | | |
|---|---|---|
| JP | 11-164281 A | 6/1999 |
| JP | 2000-123480 | 4/2000 |
| JP | 2001-245223 A | 9/2001 |
| JP | 2001-309329 A | 11/2001 |
| JP | 2002-010182 A | 1/2002 |
| JP | 2002-084523 A | 3/2002 |
| JP | 2002-101086 A | 4/2002 |
| JP | 2002-111613 A | 4/2002 |
| JP | 2002-203070 | 7/2002 |
| JP | 2002-237787 A | 8/2002 |
| JP | 2002-247512 A | 8/2002 |
| JP | 2002-251328 A | 9/2002 |
| JP | 2002-262252 A | 9/2002 |
| JP | 2002-262269 A | 9/2002 |
| JP | 2002-335504 A | 11/2002 |
| JP | 2002-344924 | 11/2002 |
| JP | 2002-351312 A | 12/2002 |
| WO | 02/37843 A1 | 5/2002 |

\* cited by examiner

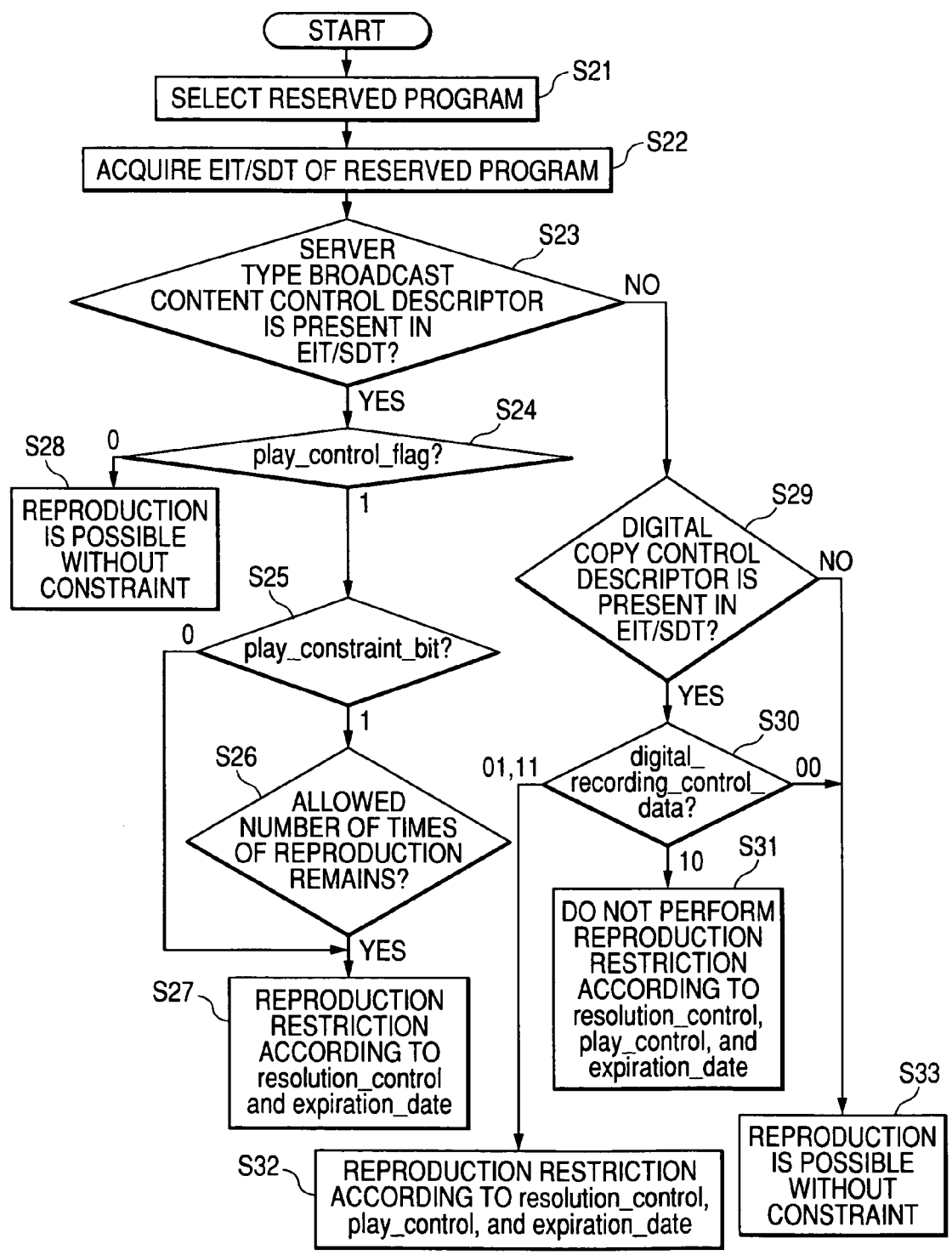

CONTENT DELIVERY SYSTEM, CONTENT DELIVERY APPARATUS, CONTENT RECORDING AND REPRODUCTION APPARATUS AND CONTENT RECORDING AND REPRODUCTION METHOD, AND COMPUTER PROGRAM

TECHNICAL FIELD

The present invention relates to a content delivery system, a content delivery apparatus, a content recording and reproduction apparatus and a content recording and reproduction method, and a computer program that perform delivery service so as to protect contents from copying without permission and illegal use. In particular, the invention relates to a content delivery system, a content delivery apparatus, a content recording and reproduction apparatus and a content recording and reproduction method, and a computer program that protect contents, which are delivered by digital broadcasting, from copying without permission and illegal use.

More specifically, the invention relates to a content delivery system, a content delivery apparatus, a content recording and reproduction apparatus and a content recording and reproduction method, and a computer program in server type broadcasting in which viewing is performed in a form of reproducing broadcast contents after temporarily storing the broadcast contents on a receiving client side. In particular, the invention relates a content delivery system, a content delivery apparatus, a content recording and reproduction apparatus and a content recording and reproduction method, and a computer program that protect broadcast contents stored on a receiver side from copying without permission and illegal use.

BACKGROUND ART

Digitization of data is advanced rapidly in the technical field of broadcasting. This is based on, for example, the fact that digital data can use a band more efficiently and can realize higher image quality and higher sound quality than analog data and the fact that the digital data has higher affinity with data except video and sound data than analog data.

When broadcast contents are digital data, since it is possible to carry data for four channels with one channel and to transmit data for a high definition television without change, sophistication and diversification of services are derived. For example, various kinds of system information such as an EPG (Electric Program Guide) is sent together with video information and voice information, whereby it is possible to improve services for users (viewers) (the EPG includes functions such as reservation for recording in a VTR in addition to provision of information such as a broadcast schedule and a program name of a broadcast program).

In addition, since broadcast data of a digital format has high affinity with information apparatuses except a television such as a general purpose computer system, it is expected that broadcasting and communication are fused by the digital broadcasting. For example, a tuner card for digital satellite data broadcasting is attached to a general purpose computer system, received EPG data is analyzed in a computer, and an electronic program table is window-displayed on a computer display, whereby it is possible to realize switching of programs, recording reservation, and the like according to an operation by a mouse cursor. It is needless to mention that it is also possible to digital-recording digital broadcast data in a built-in hard disk of the computer directly. In addition, it is possible to develop a two-way service according to an upper link between a receiving client and a broadcasting station using a computer network.

In addition, recently, a server type broadcast system, which uses a receiver (a television or a video recording and reproduction apparatus) mounted with a large capacity storage such as a hard disk device to receive broadcast contents and reproduce the broadcast contents after temporarily storing the broadcast contents in the receiver, has been widely used.

The server type broadcast system makes it possible to perform, in addition to viewing on a real time basis such as normal television reception, deliver videos and sounds in advance to allow viewing from a designated time and perform scene retrieval and digest viewing using information or the like to be delivered simultaneously.

Incidentally, since broadcast contents are works, proper protection of the broadcast contents from copying without permission and illegal use under the copyright law is essential for development of content production and delivery businesses as well as assurance of benefit for users in that the users enjoy better contents.

However, since it is extremely easy to copy and tamper data and contents of a digital format, the data and the contents are exposed to danger of copyright infringement without protection.

At present, in a digital broadcast system for performing real-time viewing, descriptive information concerning control for digital copy and content usage is inserted into contents, whereby control is carried out on a receiver side such that the contents are used legally in accordance with these pieces of descriptive information.

However, at present, there is no system for sending copyright information for contents in the server type digital broadcasting. In other words, in the server type digital broadcasting, it is also necessary to establish a system that makes it possible to protect broadcast contents stored in a receiver in accordance with the sent copyright information.

DISCLOSURE OF THE INVENTION

It is an object of the invention to provide an excellent content delivery system, an excellent content delivery apparatus, an excellent content recording and reproduction apparatus and an excellent content recording and reproduction method, and an excellent computer program that can properly protect contents, which are delivered by digital broadcasting, from copying without permission and illegal use.

It is another object of the invention to provide an excellent content delivery system, an excellent content delivery apparatus, an excellent content recording and reproduction apparatus and an excellent content recording and reproduction method, and an excellent computer program in server type broadcasting in which viewing is performed in a form of reproducing broadcast contents after temporarily storing the broadcast contents on a receiving client side.

It is still another object of the invention to provide an excellent content delivery apparatus, an excellent content recording and reproduction apparatus and an excellent content recording and reproduction method, and an excellent computer program that can property protect broadcast contents stored on a receiver side from copying without permission and illegal use.

The invention has been devised taking into account the problems mentioned above, and a first aspect of the invention is a server type content delivery system, including:

a content delivery server that delivers broadcast contents consisting of a data stream constituting a broadcast program, control information for tuning, and program information; and a content receiving client that receives the data stream constituting a broadcast program, the control information for tuning, and the program information and reproduces the broadcast contents after temporarily storing the broadcast contents, characterized in that the delivery server delivers the broadcast contents with control information concerning copyright protection for contents inserted in a section of the control information for tuning and/or the program information, and the content receiving client controls a reproduction operation and/or a recording reservation processing operation for the stored contents in accordance with the control information concerning copyright protection for contents inserted in the section of the control information for tuning and/or the program information.

Note that the "system" in this context refers to a logical set of plural apparatuses (or functional modules realizing specific functions), and it does not matter whether the respective apparatuses or functional modules are provided in a single housing.

According to the content delivery system in accordance with the invention, contents are sent from a broadcasting side in a state in which copyright information for the contents is added to the contents. Thus, in a receiving client side applicable to server type digital broadcasting that has received the contents, it is possible to perform appropriate control according to the copyright information for the contents. It is possible to perform detailed control on a display device, which is incorporated in or connected to a receiver, according to this copyright information.

Here, it is possible to include control information concerning copying of broadcast contents and reproduction control information concerning stored broadcast contents in the control information concerning copyright protection for contents. This reproduction control information includes the number of times of reproduction of contents, restriction of display resolution at the time of reproduction of contents, and an expiration date of content reproduction.

On the receiving client side, in the case in which the reproduction control information concerning stored broadcast contents is included in the section of the control information for tuning and/or the program information, it is possible to control a reproduction operation or a recording reservation operation for contents on the basis of the number of times of reproduction of contents, the limit of display resolution at the time of reproduction of contents, and the expiration date of content reproduction described in the reproduction control information.

Alternatively, in the case in which the reproduction control information concerning stored broadcast contents is not included in the section of the control information for tuning and/or the program information, the receiving client can control a reproduction operation or a recording reservation operation for contents on the basis of recording control data for managing a copy generation of contents described in the control information concerning copying of broadcast contents.

In addition, a second aspect of the invention is a computer program that is described in a computer readable format so as to execute processing for receiving and reproducing broadcast contents in server type broadcasting on a computer system, including:

a reception step of receiving broadcast contents consisting of a data stream constituting a broadcast program, control information for tuning, and program information;

a storage step of storing the received broadcast contents; and a reproduction step of reproducing the contents stored in the storage step, characterized in that in the storage step, a recording reservation processing operation for contents is controlled in accordance with control information concerning copyright protection for contents inserted in a section of the control information for tuning and/or the program information and/or, in the reproduction step, a reproduction processing operation for the stored contents is controlled in accordance with control information concerning copyright protection for contents inserted in the section of the control information for tuning and/or the program information.

The computer program according to the second aspect of the invention defines a computer program that is described in a computer readable format so as to execute predetermined processing on a computer system. In other words, the computer program according to the second aspect of the invention is installed in the computer system, whereby a cooperative action is shown on the computer system, and it is possible to obtain the same actions and effects as the content delivery system according to the first aspect of the invention.

Other objects, characteristics, and advantages of the invention will be apparent through a detailed explanation based on an embodiment of the invention to be described later and attached drawings.

BRIEF DESCRIPTION OF THE DRAWINGS

FIG. 4 is a flowchart showing a recording reservation processing operation for contents in the receiver 1.

BEST MODE FOR CARRYING OUT THE INVENTION

Figure 1:
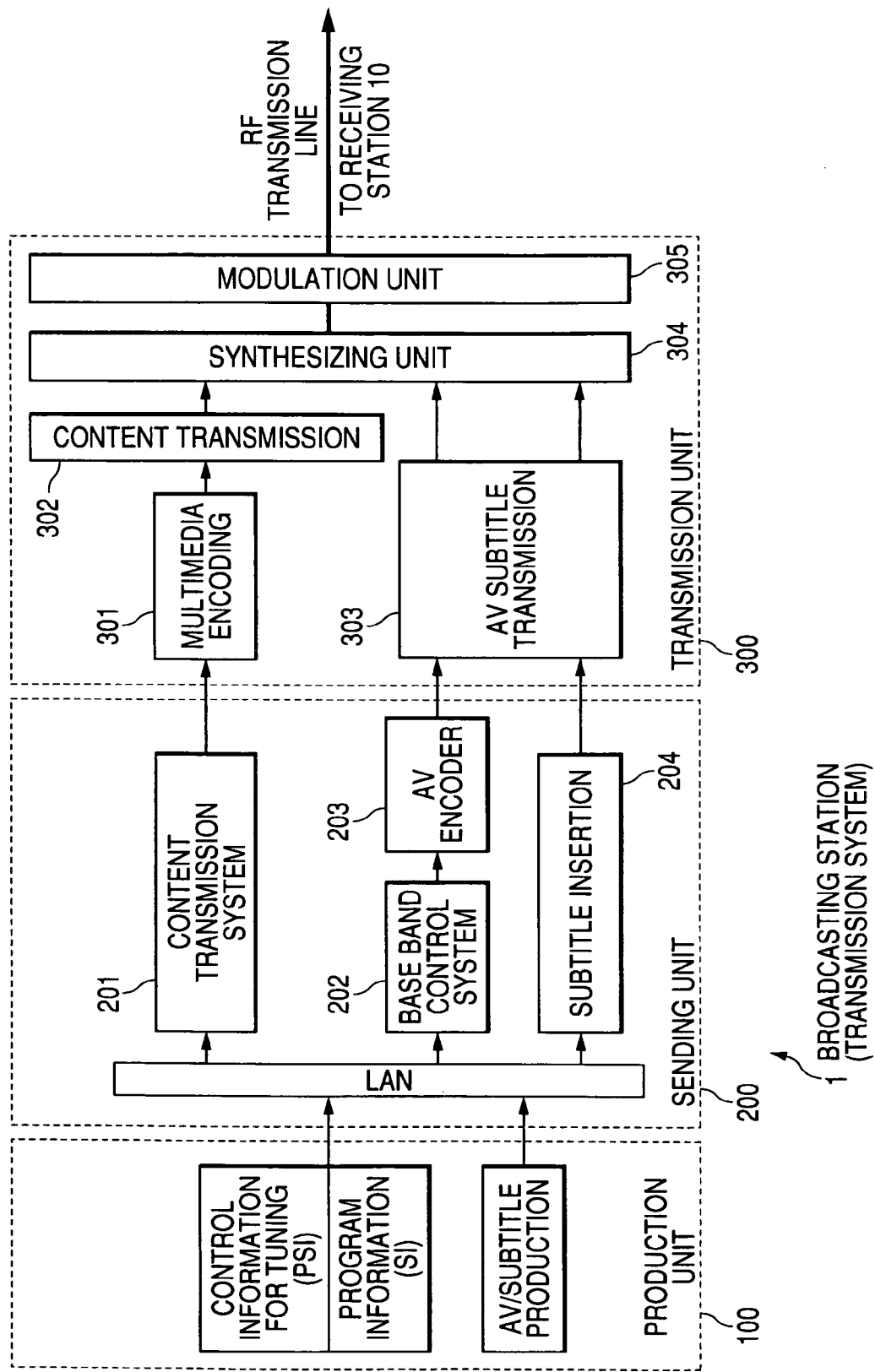
FIG. 1 is a diagram schematically showing a structure for sending digital broadcast contents.

An embodiment of the invention will be described in detail with reference to the drawings.

In Japan, standardization work for digital broadcasting is advanced with the ARIB (Association of Radio Industries and Businesses) as a leader. According to this standardization work, the MPEG2 system (ISO/IEC 13818-1 GENERIC CODING OF MOVING PICTURES AND ASSOCIATED AUDIO: SYSTEMS Recommendation H. 220.0) is adopted in domestic digital broadcasting (digital satellite broadcasting, digital ground wave broadcasting, digital CATV (Cable Television)).

The MPEG2 system defines a system for multiplexing individual streams such as encoded video, audio, and additional data and reproducing the respective data in synchronization to one another. As the MPEG2 system, there are two types of systems, namely, MPEG2-PS (Program Stream) and MPEG2-TS (Transport Stream).

In addition, a PES packet, in which data of subtitles and the like are stored, is divided into plural TS packets and transmitted in the same manner as video and audio packets.

It is assumed that the MPEG2-PS is applied to transmission and storage of data in an environment in which an error does not occur. Since it is possible to reduce redundancy, the MPEG2-PS is used in a digital storage medium, which uses a powerful error correcting code, such as a DVD (Digital Versatile Disc).

On the other hand, it is assumed that the MPEG2-TS is applied to an environment in which a transmission error of data occurs such as a broadcasting or communication network. Since it is possible to constitute plural programs in one stream, the MPEG2-TS is used for digital broadcasting and the like.

In the MPEG2-TS, plural TS (Transport Stream) packets with a fixed length of 188 bytes are collected to constitute a transport stream. A length of this TS packet of 188 bytes is determined taking into account consistency with an ATM (Asynchronous Transfer Mode) cell length.

The TS packet is constituted by a packet header with a fixed length of four bytes, an adaptation field of a variable length, and a payload. A PID (packet identifier) and various flags are defined in the packet header. A type of the TS packet is identified by the PID.

A PES (Packetized Elementary Stream) packet, in which an individual stream of a video, an audio, and the like are stored, is divided into plural TS packets having the same PID number and transmitted. For example, the MPEG2 system is used for encryption of a video. In addition, for encoding of an audio, for example, an MPEG2-AAC (MPEG2 Advanced Audio Coding) system is adopted in BS (Broadcast Satellite) digital broadcasting.

In addition, a PES packet, in which data of subtitles and the like are stored, is divided into plural TS packets and transmitted in the same manner as the packet for a video or an audio.

Moreover, a packet of information described in a table of section formats such as PSI (Program Specific Information) and SI (Service Information) is included in the transport stream.

The PSI is information necessary in a system for selecting and receiving a desired channel of broadcast (control information for tuning). In this information, there are sections of a PAT (Program Association Table), a PMT (Program Map Table), a NIT (Network Information Table), a CAT (Condition Access Table), and the like. When a user changes a channel, a receiver can tune in to a channel desired by the user by appropriately processing information in these sections.

A PID and the like of the PMT corresponding to a program number are stored in the PAT. Video, audio, and additional data included in a corresponding program and a PID of a PCR are described in the PMT. Detailed information concerning an entire broadcast system is described in the NIT. For example, information on all programs included in a network and information indicating which carrier wave frequency a target program is sent at are described. Information on identification of a restricted reception system and individual information such as contract information is described in the CAT.

On the other hand, the SI is a section that is used for a service of a broadcasting enterprise. As the SI, there are sections of an EIT (Event Information Table), a SDT (Service Description Table), and the like. Detailed information and a broadcast time of a program are described in the EIT. On a receiver side, a program table (EPG) is displayed and recording reservation is made by processing these sections.

As such digital broadcasting of the MPEG2 system, in Japan, digital CS (Communication Satellite) broadcasting and digital BS (Broadcast Satellite) broadcasting have already been started. In the digital BS broadcasting, in addition to the normal SDTV (Standard Definition Television), broadcasting of a HDTV (High Definition Television) is performed. In addition, digital ground wave broadcasting is under consideration.

In the MPEG2 system, in order to put detailed information in each section, a descriptor is defined and inserted in the section. This makes it possible to transmit minute information.

In order to transmit copyright information for contents, in the ARIB STD-B10, digital_copy_control_descriptor (a digital copy control descriptor) and content_availability_descriptor (a content availability descriptor) are defined and these descriptors are inserted in the PMT to define copyright information of a program.

Table 1 shows syntax of the digital copy control descriptor. Two bits of digital_recording_control_data (digital recording control data) in the digital copy control descriptor are used for copy control (generation management for copying). When these two bits are "00", copying can be performed freely, when these two bits are "11", copying is prohibited, and when these two bits are "10", copying for only one generation is permitted. In other words, these two bits are used for performing copy control of a CGMS (Copy Generation Management System). Note that the copy control according to the CGMS is described in, for example, JP-A-2000-123480.

Table 1
Data Structure

In addition, the copy availability descriptor represents copyright information of a program together with the digital copy control descriptor. The copy availability descriptor can restrict resolution when a stored image is outputted and restrict a recording time at the time when an image, for which copying is prohibited, is temporarily recorded in a video recording and reproduction apparatus. Table 2 shows syntax of the copy availability descriptor.

Table 2
Data Structure

In the content-availability-descriptor, when encryption_mode is 0, even in the case in which the CGMS allows copying without any constraint, a high-speed digital output is required to perform encrypted output. Image_constrain_token restricts resolution when a stored image is analog-outputted. Retention_mode indicates whether a recording time at the time when an image, for which copying is prohibited, is to be restricted, and retention_state indicates a recording restricted time at the time when an image, for which copying is prohibited, is temporarily recorded. When retention_mode is "0", it is possible to temporarily store an image only for a time indicated by retention_state. Encryption_mode indicates whether data of contents is to be encrypted and outputted from a high-speed digital terminal.

In addition, a video recording and reproduction apparatus using a large capacity hard disk device, which is widely used in recent years, has a function for storing a moving image being received, freezes a screen being received when a user has a visitor or the like, and reproducing the moving image recorded in the HDD from a point where the screen is frozen after the visitor leaves. Retention_state of the content availability descriptor is effective, in particular, in performing copy restriction for contents, for which copying is prohibited, in the video recording and reproduction apparatus having such a function.

As described above, concerning broadcast contents to be viewed on a real time basis, copyright protection is realized properly by inserting the digital copy control descriptor or the content availability descriptor in the PMT.

In the invention, in a digital receiver that uses the mechanism of information transmission in broadcasting described above, transmits copyright information at the time of content reproduction in server type broadcasting, and reproduces broadcast contents, it is made possible to realize a mechanism for content protection.

In this embodiment, a server type broadcast content control descriptor is defined as copyright information at the time of content reproduction. Table 3 shows Syntax of this server type broadcast content control descriptor.

Table 3

Data Structure

It is possible to insert the server type broadcast content control descriptor in a descriptor loop of the PMT. In the case in which the descriptor is arranged in a first loop of the PMT, it is possible to apply restriction of this descriptor to all ESs included in a designated program. In the case in which the descriptor is arranged in an ES loop of the PMT, it is possible to adapt restriction of the descriptor only to a designated ES. In the case in which this descriptor is arranged in both the first loop and the ES loop, restriction of the descriptor in the ES loop is given priority over the descriptor in the first loop only for the designated ES. In this case, when there is no descriptor in other ES loop, the restriction in the descriptor in the first loop is applied.

Store_content_control_descriptor in Table 3 consists of a flag of three bits. When 1 is set in the flag, the following if statement is made effective, and it is necessary to control contents in accordance with conditions of the if statement.

(1) Resolution_Control_Flag (Resolution Control Flag)

In the case in which the resolution control flag is set to 1, when an image is displayed on a display device to which a server type broadcast receiver is connected (when a STB (set top box) is a receiver, the display device is equivalent to a monitor, and when a television includes a receiver, the display device is equivalent to a display of the television. However, in the latter case, since a signal does not exit to the outside, restriction does not have to be performed in some cases), it is necessary to apply pixel restriction to a designated number of pixels. In this case, it is necessary to apply pixel restriction to a maximum pixel size defined in an if statement below (if (resolution_control_flag==1)).

On the other hand, in the case in which the resolution control flag is set to 0, the if statement below does not appear in the descriptor.

Sixteen bits are arranged in maximum_horizontal_pixel_number (the maximum number of horizontal pixels) and maximum_vertical_pixel_number (the maximum number of vertical pixels) of the if statement, respectively, and a maximum pixel size to be restricted is described in Hex (hexadecimal representation). For example, in the case in which the user desires to set an upper limit of an output image of contents to 720 pixels in a lateral direction and 480 pixels in a longitudinal direction, a value of 0x2d0 is described in maximum_horizontal_pixel_number and a value of 0x1e0 is described in maximum_vertical_pixel_number.

(2) Play_Control_Flag (Reproduction Control Flag)

In the case in which this bit is set to 1, an if statement below (if (play_control_flag==1)) is made effective. On the other hand, in the case in which this bit is set to 0, the if statement below does not appear in the descriptor.

When play_constraint_bit in the if statement changes to 1, this means that restriction is applied to reproduction of stored contents, and the reproduction equal to or more than the number of times of number_of_play following play_constraint_bit is prohibited. For example, in the case in which reproduction is restricted to twice, 0000010 is described.

When play_constraint_bit changes to 0, it is possible to perform reproduction without any restriction on the number of times of reproduction. In this case, a value of number_of_play changes to "don't care".

(3) Expiration_Date_Flag (Expiration Date Flag)

In the case in which this bit changes to 1, an if statement below (if (expiration_date_flag==1) is made effective. On the other hand, in the case in which this bit is set to 0, the if statement below does not appear.

Expiration_date of 40 bits in the if statement is defined by ARIB STD-B10 and is the same as the definition of the Japanese standard time used in JST_time of a TOT (Time Offset Table). The Japanese standard time (JST) is defined as "UTC (Universal Time Coordinated)+9 hours". When expiration_date is defined, a reproduction function is made effective until the defined time and, when the defined time is exceeded, output for display should not be performed. For example, in the case in which a data recording medium such as a HDD is incorporated in a receiver and contents can be held, restricted time described here is made effective. In addition, concerning a receiver in which restricted time can be designated in a recording medium, this restriction is applied.

In the case in which component_flag changes to 1, an if statement below is made effective. On the other hand, when this flag changes to 0, the if statement below (if (component_flag==1) does not appear. This flag is not used in the case in which a descriptor is arranged in the PMT but is used for designating an ES when copyright information for contents is sent to the ES in the case in which information is described in the EIT for reservation or the like. A value of the ES to be designated is put in component_tag, whereby it is possible to use the flag for reservation of server type broadcast contents.

Next, processing in the case in which the server type broadcast content control descriptor is not arranged in the PMT will be explained. In the case in which the server type broadcast content control descriptor is not arranged in the PMT, a system operator of actual broadcasting can determine copy control according to a state of operation of the broadcast. However, it is also possible to define operation according to a value of the digital copy control descriptor.

For example, in the case in which digital_recording_control_data of the digital copy control descriptor is '11' and takes a value of "copying is prohibited", since recording is prohibited in normal broadcasting, restriction for not performing recording of contents is also made possible. On the other hand, resolution_control of the serer type broadcast content control descriptor is set to, for example, 640×480, play_control is set to once, and expiration_date is set to one day after a day of broadcast to make it possible to perform operation with a larger number of restrictions.

Next, digital_recording_control_data of the digital copy control descriptor is '10' and takes a value of "copying is allowed only once", for example, operation for not performing the restriction according to resolution_control of the server type broadcast content control descriptor, eliminating the restriction of the number of times of play_control, and also eliminating the restriction of expiration is made possible.

Next, in the case in which digital_recording_control_data of the digital copy control descriptor is '00' and "copying is allowed without constraint" or the case in which the digital copy control descriptor is not arranged, it is defined that the reproduction function can be performed without restriction.

Only an example is indicated in the above description for the restriction on operation according to a value of this digital copy control descriptor as well, and a system operator of actual broadcasting can determine conditions for the operation.

Note that the respective parameters designated by the server type broadcast content control descriptor shown in Table 3 are examples, and the gist of the invention is not limited to these parameters. For example, it is also possible to define a descriptor with reduced number of parameters or a descriptor having a different structure in order to realize the same object. In addition, it is also possible to use reserved_future_use of a last field in the descriptor when a definition of copyright information to be required in future is added. It is also possible to put the parameters of the server type broadcast content control descriptor in an area of reserved_future_use defined in the last field in the content availability descriptor shown in Table 2 to substitute for the server type broadcast content control descriptor in Table 3.

In the following description, an embodiment of a broadcast system, to which the invention is applied, will be explained.

FIG. 1 schematically shows a structure for sending digital broadcast contents in a broadcast system. A transmission system 1 includes a production unit 100, a sending unit 200, and a transmission unit 300. The respective units will be hereinafter explained.

The production unit 100 is equivalent to a site where respective contents of broadcast program information to be sent as digital broadcast contents are produced. In other words, the production unit 100 produces respective resource elements such as individual streams of a video, an audio, and the like, data of subtitles and the like, and control information described in section formats of PSI, SI, and the like, program information, and the like that constitute a broadcast program.

The PSI includes sections of a PAT, a PMT, a NIT, a CAT, and the like, and the SI includes sections of an EIT, an SDT, and the like (as described above). A digital copy control descriptor, a content availability descriptor, and a server type broadcast content control descriptor, in which information on copyright protection for digital broadcast contents is described, are inserted in the sections of the PMT, the EIT, the SDT, and the like.

A program main part consisting of individual streams of a video, an audio, and the like and broadcast contents consisting of control information for tuning and program information concerning this program main part are transferred to the sending unit 200 through, for example, a LAN (Local Area Network) laid in a broadcasting station 1.

In the sending unit 200, data to be sent is packetized by a content transmission system 201, a base band control system 202, an AV encoder 203, and a subtitle insertion 204 and passed to the transmission unit 300.

In the transmission unit 300, the program information is encoded in a multimedia encoding unit 301 and passed to a content transmission system 302. A synthesizing unit 304 synthesizes respective output data of the content transmission system 302 and the AV subtitle transmission system 303. A modulation unit 305 RF-modulates a synthesized signal and transmits the synthesized signal to a receiving station 10 via an RF transmission line.

In the RF transmission line, first, the RF signal is transmitted from a transmission antenna installed in the broadcasting station 1 to a broadcast satellite 5 and subsequently received by a receiving antenna of the receiver 10 via a propagation path.

Figure 2:
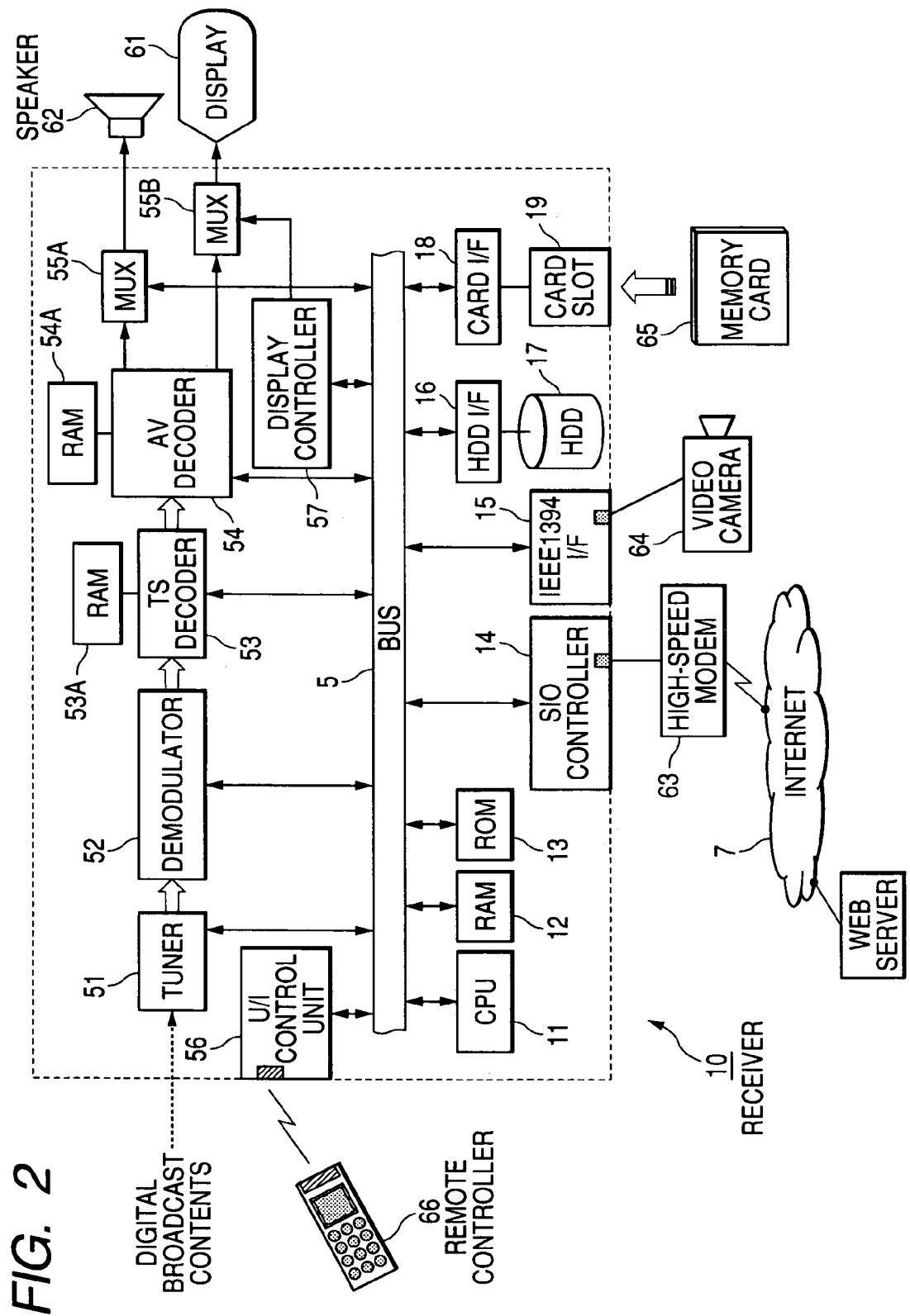
FIG. 2 is a diagram schematically showing an example of a hardware structure of a receiver 10 that receives digital broadcast contents.

FIG. 2 schematically shows an example of a hardware structure of the receiver 10 that receives digital broadcast contents. This receiver 10 is spread to general households, for example, in a form called a STB (set top box).

In the receiver 10, a CPU (Central Processing Unit) 11 serving as a main controller mutually connects with respective hardware components via a bus 50 and executes supervisory control with respect to the respective components. The respective units will be hereinafter explained.

A broadcast wave received by an antenna (not shown) is supplied to a tuner 51. The broadcast wave complies with a defined format. However, the broadcast wave may be a wired broadcast wave or a ground wave other than the broadcast wave for satellite broadcasting described above and is not specifically limited.

The tuner 51 performs tuning for a broadcast wave of a predetermined channel in accordance with an instruction from the CPU 11 and outputs reception data to a demodulator 52 following the tuner 51. The demodulator 52 demodulates the digitally modulated reception data. Note that, depending upon whether a broadcast wave to be transmitted is analog or digital, it is possible to change or expand the structure of the tuner 11 in an appropriate manner.

Demodulated digital data is the "transport stream" (described above) that is constituted by multiplexing AV data subjected to MPEG2 compression and program information. The former AV data is constituted by video and audio information and subtitle data constituting a broadcast program body. In addition, the latter program information is data incidental to this broadcast program body and is described in section formats of PSI, SI, and the like and used for an EPG and recording reservation for a program.

A TS decoder 53 interprets this transport stream, separates the transport stream into the AV data subjected to MPEG2 compression and the program information, sends the former to an AV decoder 54, and transmits the latter to the CPU 11 through the bus 50. The TS decoder 53 may include a memory for work data storage 53A in a local of the TS decoder 53 itself.

When the AV decoder 54 receives real time AV data compressed in the MPEG2 system from the TS decoder 53, the AV decoder 54 separates the real time AV data into compressed video data and compressed audio data. Then, the AV decoder 54 subjects the video data to MPEG2 expansion processing to reproduce the original video signal and subjects the audio data to PCM (Pulse Code Modulation) decoding and, then, synthesizes the audio data with additional sounds to generate a reproduced audio signal. The AV decoder 54 may include a memory for work data storage 54A in a local of the AV decoder 54 itself. The reproduced video signal is outputted for display on a display 61 via a multiplexer 55B. In addition, the reproduced audio signal is audio-outputted to a speaker 62 via a multiplexer 55A. Alternatively, the compressed video data and the compressed audio data are transferred to a hard disk device 17 through the bus 50 without being expanded, temporarily stored in the hard disk device 17, and then subjected to expansion processing in the AV decoder 54 anew to be reproduced and outputted.

A user interface control unit 56 is a module that processes an input operation from a user and includes, for example, an operation button/switch (not shown), which the user uses to directly perform manual operation, and a function for accepting a remote operation from a remote controller 66 via an infrared ray (IR). In addition, the user interface control unit 56 may include a display panel or an LED indicator for displaying contents that are set presently (not shown).

The CPU 11 is a main controller that supervises operations of the entire receiver 10. In addition, the CPU 11 can perform processing for control information for tuning and program information that are transferred through the bus 50. In this embodiment, the control information for tuning and the program information are described in section formats of PSI, SI, and the like (as described above). Then, a digital copy control descriptor in which information on copyright protection for digital broadcast contents, a content availability descriptor, and a server type broadcast content control descriptor are inserted in these sections. Thus, the CPU 11 controls real time output and reproduction output as well as a processing operation for recording reservation of received broadcast contents and protects a copyright of the contents on the basis of the contents described in these descriptors.

A RAM (Random Access Memory) 12 is a writable volatile memory that is used for loading an execution program code of the CPU 11 and writing work data of an execution program. In addition, a ROM (Read Only Memory) 13 is a read-only memory that permanently stores a self-diagnosis and/or initialization program, which is executed when a power supply for the receiver 10 is inputted, and a micro-code for hardware operation.

A serial input/output (SIO) controller 14 is a peripheral controller for performing serial data exchange with devices external to the receiver 10. A high-speed modem 63 for modulating and demodulating transmission data on an analog telephone line is externally connected to a serial port prepared in the SIO controller 14. By making PPP (Point-to-Point Protocol) connection to a predetermined access point (not shown) with this high-speed modem 63, the receiver 10 is connected to the Internet 7 serving as a wide area network and can form an upper link to a broadcasting station.

An IEEE (Institute of Electrical and Electronics Engineers) 1394 interface 15 is a serial high-speed interface that is capable of performing data transmission and reception at a data rate of about several hundred MBps. External devices applicable to the IEEE1394 can be connected to the IEEE1394 port in a form of daisy chain connection or tree connection. Examples of the devices applicable to the IEEE1394 include a video camera 64 and a scanner (not shown).

A hard disk driver (HDD) 17 is an external storage for storing programs, data, and the like in a predetermined file format and usually has a relatively large capacity of about several GB. The HDD 17 is connected to the bus 50 via a hard disk interface 18. In this embodiment, the HDD 17 is also used for storage of received broadcast contents, and the receiver 1 functions as a recording and reproduction device for server type broadcast contents.

A card interface 18 is a device for realizing a bus protocol between a card type device 65 inserted in a card slot 19 and the bus 50. An example of the card type device 65 is a PC card that has a size of a credit card and is constituted in a cartridge type. The PC card conforming to the specification "PC Card Standard" that is developed by the PCMCIA (Personal Computer Memory Card Interface Association) and the JEIDA (Japan Electronic Industry Development Association) in cooperation.

A display controller 57 is a dedicated controller for controlling display output of broadcast program information and the like based on data broadcast contents.

This receiver 10 controls a tuning operation of the tuner 51 in accordance with a user input command via the user interface control unit 56 and performs display control for program information. In other words, the CPU 11 processes program information transferred from the TS decoder 53, converts the program information into data for display, and supplies the data to the display controller 57. The display controller 57 generates an image signal of the program information on the basis of this display data and supplies the image signal to the multiplexer 55B.

In addition, the CPU 11 also processes audio data included in the program information and supplies the audio data to the multiplexer 55A through the bus 50. The multiplexers 55A and 55B multiplexes the display data and the audio data supplied from the CPU 11 with the video data and the audio data (as well as the subtitles) serving as a broadcast program body outputted from the AV decoder 54, respectively, and outputs the display data and the audio data to the display 61 and the speaker 62, respectively.

Moreover, the CPU 11 decodes contents of a server type broadcast content control descriptor inserted in sections of a PMT, an EIT, an SDT, and the like in the program information described in the section formats of PSI, SI, and the like and performs a reproduction operation and a recording reservation operation with a copyright of server type broadcast contents protected.

Figure 3:
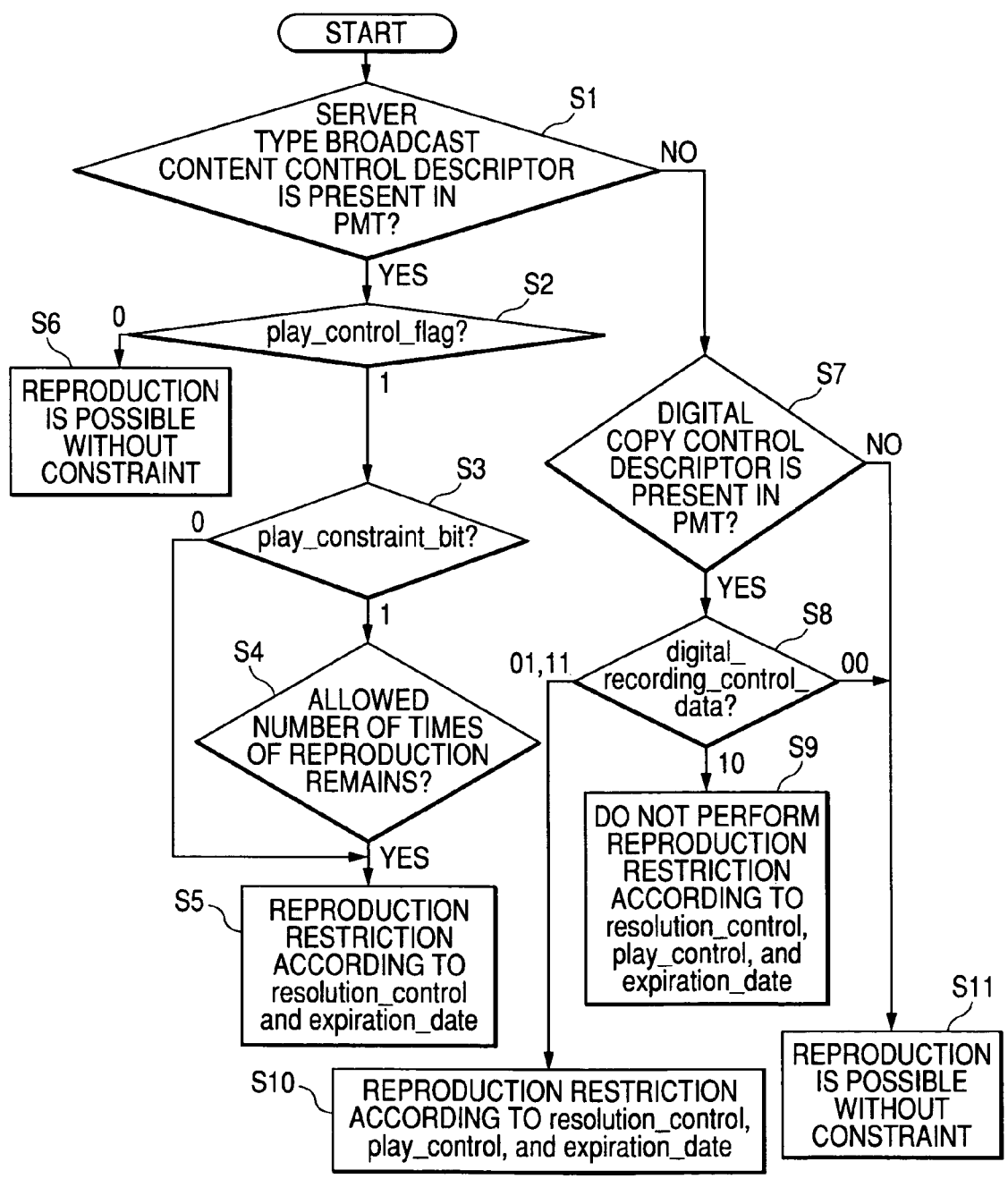
FIG. 3 is a flowchart showing a reproduction processing operation for contents in a receiver 1.

FIG. 3 shows a reproduction processing operation for contents in the receiver 1 in a form of a flowchart.

First, a PMT serving as program information of received broadcast contents is checked whether a server type broadcast content control descriptor is inserted therein (step S1).

If the server type broadcast content control descriptor is inserted in the PMT, the descriptor is subsequently checked whether play_control_flag (a reproduction control flag) is set therein (step S2).

If play_control_flag is not set, it is possible to reproduce the broadcast content without constraint (step S6)

On the other hand, if play_control_flag is set, this means that restriction on reproduction of stored contents is applied, and the descriptor is subsequently checked whether play_constraint_bit is set therein (step S3).

When play_constraint_bit changes to 0, it is possible to perform reproduction without any restriction of the number of times of reproduction. In this case, a value of number_of_play is "don't care".

On the other hand, when play_constraint_bit changes to 1, this means that restriction on reproduction of stored contents is applied, and reproduction for the number of times equal to or larger than the following number_of_play is prohibited (step S4).

Then, if an allowed number of times of reproduction still remains, reproduction of the contents is allowed within restriction of the number of pixels designated by resolution_control_flag (a resolution control flag) and restricted time designated by expiration_date_flag (an expiration date flag) (step S5).

In addition, if it is judged in step S1 that the server type broadcast content control descriptor is not inserted in the PMT, the PMI is subsequently checked whether a digital copy control descriptor is inserted therein (step S7).

If the digital copy control descriptor is not inserted, it is possible to reproduce the contents without constraint (step S11).

On the other hand, if the digital copy control descriptor is inserted, two bits of digital_recording_control_data (digital recording control data) in the digital copy control descriptor is further checked (step S8).

The two bits of digital_recording_control_data are used for generation management for copying. If the two bits are "00", this means that copying can be performed freely, and it is possible to reproduce the contents without constraint (step S11).

If the two bits are "11" or "01", reproduction of the contents is allowed within restriction of the number of pixels designated by resolution_control_flag (resolution control flag) and restricted time designated by expiration_date_flag (expiration date flag) (step S10).

If the two bits are "10", copying for only one generation is allowed, and it is possible to reproduce the contents without being subjected to reproduction restriction according to resolution_control_flag and expiration_date_flag (step S9).

FIG. 4 shows a recording reservation processing operation for contents in the receiver 1 in a form of a flowchart.

First, a reserved program (step S21) is selected and sections of an EIT, an SDT, and the like are acquired from program information SI of the reserved program (step S22).

Then, the sections of the EIT, the SDT, and the like are checked whether a server type broadcast content control descriptor is inserted therein (step S23).

If the server type broadcast content control descriptor is inserted in the PMT, the descriptor is subsequently checked whether play_control_flag (reproduction control flag) is set therein (step S24).

If play_control_flag is not set, since it is possible to reproduce the broadcast contents without constraint, reservation processing is performed without constraint (step S28).

On the other hand, if play_control_flag is set, this means that restriction on reproduction of stored contents is applied, and the descriptor is subsequently checked whether play_constraint_bit is set therein (step S25).

When play_constraint_bit changes to 0, since it is possible to perform reproduction without restriction of the number of times of reproduction, reservation processing is possible. In this case, a value of number_of_play is "don't care".

On the other hand, when play_constraint_bit changes to 1, this means that restriction on reproduction of stored contents is applied, and the number of times of the following number_of_play is checked (step S26).

Then, if an allowed number of times of reproduction still remains, reservation processing of the contents is performed within restriction of the number of pixels designated by resolution_control_flag (resolution control flag) and restricted time designated by expiration_date_flag (expiration date flag) (step S27).

In addition, if it is judged in step S23 that the server type broadcast content control descriptor is not inserted in the sections of the EIT and the SDT, the sections of the EIT and the SDT subsequently checked whether a digital copy control descriptor is inserted therein (step S29).

If the digital copy control descriptor is not inserted, it is possible to perform reservation processing for the contents without constraint (step S33).

On the other hand, if the digital copy control descriptor is inserted, two bits of digital_recording_control_data (digital recording control data) in the digital copy control descriptor is further checked (step S30).

The two bits of digital_recording_control_data are used for generation management for copying. If the two bits are "00", this means that copying can be performed freely, and it is possible to perform reservation processing for the contents without constraint (step S33).

If the two bits are "11" or "01", reservation processing for the contents is allowed within restriction of the number of pixels designated by resolution_control_flag (a resolution control flag) and restricted time designated by expiration_date_flag (an expiration date flag) (step S32).

If the two bits are "10", copying for only one generation is allowed, and it is possible to perform reservation processing for the contents without being subjected to reproduction restriction according to resolution_control_flag and expiration_date_flag (step S33).

The invention has been described in detail with reference to the specific embodiment. However, it is obvious that those skilled in the art can make alterations and substitutions of the embodiment within a range not departing from the gist of the invention. In other words, the invention has been disclosed in a form of illustration and should not be interpreted in a restricted manner. To judge the gist of the invention, patent claims should be taken into account.

Industrial Applicability

According to the invention, it is possible to provide an excellent content delivery system, an excellent content delivery apparatus, an excellent content recording and reproduction apparatus and an excellent content recording and reproduction method, and an excellent computer program that can properly protect contents, which are delivered by digital broadcasting, from copying without permission and illegal use.

In addition, according to the invention, it is possible to provide an excellent content delivery system, an excellent content delivery apparatus, an excellent content recording and reproduction apparatus and an excellent content recording and reproduction method, and an excellent computer program in server type broadcasting in which viewing is performed in a form of reproducing broadcast contents after temporarily storing the broadcast contents on a receiving client side.

Further, according to the invention, it is possible to provide an excellent content delivery apparatus, an excellent content recording and reproduction apparatus and an excellent content recording and reproduction method, and an excellent computer program that can property protect broadcast contents stored on a receiver side from copying without permission and illegal use.

According to the invention, it is possible to describe behaviors of a receiver in detail according to copyright information of contents in server type broadcasting. Consequently, it is possible to control a content reproduction operation on a receiver side of server type broadcast contents more closely. By inserting processing for such server type broadcast contents in a section of SI, it is possible to handle the SI as reservation information of future programs.

The invention claimed is:

1. A content distribution system, comprising:
a content delivery server that broadcasts a data stream for a broadcast program, control information for obtaining data for a broadcast program, and program information; and
a content receiving client that receives the data stream for a broadcast program, the control information for obtaining the broadcast program, and the program information, stores the broadcast contents, and reproduces the stored broadcast program, wherein
the content delivery server delivers content control information corresponding to the broadcast program,
the content receiving client controls a reproduction for the stored broadcast program based on the content control information and the copyright protection information in the control information for obtaining the broadcast program or in the program information or controls a recording reservation operation for the broadcast program based on the content control information and the copyright protection information in the control information for obtaining the broadcast program or in the program information,
the content control information relating to copy control of the content and being in the control information for obtaining the program or in the program information,
the control information including information indicating identification numbers of data packets corresponding to a broadcast program, and the program information including information about a broadcast program and broadcast time, a server type broadcast content control descriptor is defined as copyright information at the time of content reproduction, the content control descriptor being inserted in a program map table, and the applicability of the content control descriptor depending on the location of the content control descriptor within the program map tab table, such that in the case in which the descriptor is arranged in a first loop of the program map table the descriptor is applied to all elementary streams in a designated program, and when the descriptor is arranged in an elementary stream loop of the program map table the descriptor is applied only to a designated elementary stream.

2. A content distribution system according to claim 1, wherein content control information includes at least reproduction control information, and the reproduction control information includes at least one of the number of times of reproduction of contents, restriction of display resolution of reproduced broadband program, and an expiration date of content reproduction.

3. A content distribution system according to claim 2, wherein the content receiving client controls a reproduction for the received broadcast program further based on the reproduction control information or controls a recording reservation operation for the broadcast program further based on the reproduction control information.

4. A content distribution system according to claim 2, wherein the content receiving client controls a reproduction for the received broadcast program based on record control data for managing a copy generation of contents in the control information or controls a recording reservation operation for the broadcast program based on record control data for managing a copy generation of contents in the control information, when the reproduction control information is not in the control information or the program information.

5. A content distribution apparatus, comprising:
    means that stores a data stream for a broadcast program;
    means that generates control information for obtaining data for a broadcast program and program information; and
    means that transmits broadcast contents including the data stream, the control information, and the program information, wherein
    the generation means inserts content control information corresponding to the broadcast program in the control information for obtaining the program or in the program information, or the transmission means inserts content control information corresponding to the broadcast program in the control information for obtaining the program or in the program information and transmits the control information,
    the content control information relating to copy control of the content and being in the control information for obtaining the program or in the program information,
    the control information including information indicating identification numbers of data packets corresponding to a broadcast program, and
    the program information including information about a broadcast program and broadcast time,
    a server type broadcast content control descriptor is defined as copyright information at the time of content reproduction,
    the content control descriptor being inserted in a program map table, and the applicability of the content control descriptor depending on the location of the content control descriptor within the program map tab table, such that in the case in which the descriptor is arranged in a first loop of the program map table the descriptor is applied to all elementary streams in a designated program, and when the descriptor is arranged in an elementary stream loop of the program map table the descriptor is applied only to a designated elementary stream.

6. A content distribution apparatus according to claim 5, wherein content control information includes at least reproduction control information, and the reproduction control information includes at least one of the number of times of reproduction of contents, restriction of display resolution of reproduced broadband program, and an expiration date of content reproduction.

7. A content recording and reproduction apparatus, comprising:
    reception means that receives broadcast contents including a data stream for a broadcast program, control information for obtaining data for a broadcast program, program information, and content control information corresponding to the broadcast program;
    storage means that stores the received broadcast contents; and
    reproduction means that reproduces contents stored in the storage means, wherein
    the storage means controls a recording reservation operation for the contents in accordance with the content control information or the program information, or the reproduction means controls a reproduction for the received broadcast program based on the content control information in the control information for obtaining the broadcast program or in the program information,
    the content control information relating to copy control of the content and being in the control information for obtaining the program or in the program information,
    the control information including information indicating identification numbers of data packets corresponding to a broadcast program, and
    the program information including information about a broadcast program and broadcast time,
    a server type broadcast content control descriptor is defined as copyright information at the time of content reproduction,
    the content control descriptor being inserted in a program map table, and the applicability of the content control descriptor depending on the location of the content control descriptor within the program map tab table, such that in the case in which the descriptor is arranged in a first loop of the program map table the descriptor is applied to all elementary streams in a designated program, and when the descriptor is arranged in an elementary stream loop of the program map table the descriptor is applied only to a designated elementary stream.

8. A content recording and reproduction apparatus according to claim 7, wherein content control information includes at least reproduction control information, and the reproduction control information includes at least one of the number of times of reproduction of contents, restriction of display resolution of reproduced broadband program, and an expiration date of content reproduction.

9. A content recording and reproduction apparatus according to claim 8, wherein
    in the case in which the reproduction control information concerning stored broadcast contents is included in the section of the control information for obtaining the program or the program information, the storage means controls a recording reservation operation for contents on the basis of the number of times of reproduction of contents, the restriction of display resolution at the time of reproduction of contents, and the expiration date of content reproduction described in the reproduction control information, or the reproduction means controls a reproduction operation on the basis of the number of times of reproduction of contents, the restriction of display resolution at the time of reproduction of contents, and the expiration date of content reproduction described in the reproduction control information.

10. A content recording and reproduction apparatus according to claim 8, wherein the storage means controls a reproduction for the received broadcast program based on record control data for managing a copy generation of contents in the control information or controls a recording reservation operation for the broadcast program based on record control data for managing a copy generation of contents in the control information, when the reproduction control information is not in the control information or the program information.

11. A content recording and reproduction method, comprising using a processor to perform:
a reception step of receiving broadcast contents including a data stream for a broadcast program, control information for obtaining data for a broadcast program, program information, and content control information corresponding to the broadcast program or in the program information;
a storage step of storing the received broadcast contents; and
a reproduction step of reproducing the contents stored in the storage step, wherein
in the storage step, a recording reservation operation for the contents is controlled in accordance with the content control information or the program information, or in the reception step, a reproduction for the contents is controlled according to the content control information,
the content control information relating to copy control of the content and being in the control information for obtaining the program or in the program information,
the control information including information indicating identification numbers of data packets corresponding to a broadcast program, and
the program information including information about a broadcast program and broadcast time,
a server type broadcast content control descriptor is defined as copyright information at the time of content reproduction,
the content control descriptor being inserted in a program map table, and the applicability of the content control descriptor depending on the location of the content control descriptor within the program map tab table, such that in the case in which the descriptor is arranged in a first loop of the program map table the descriptor is applied to all elementary streams in a designated program, and when the descriptor is arranged in an elementary stream loop of the program map table the descriptor is applied only to a designated elementary stream.

12. A content recording and reproduction method according to claim 11, wherein content control information includes at least reproduction control information, and the reproduction control information includes at least one of the number of times of reproduction of contents, restriction of display resolution of reproduced broadband program, and an expiration date of content reproduction.

13. A content recording and reproduction method according to claim 12, wherein
in the case in which the reproduction control information concerning stored broadcast contents is included in the section of the control information for obtaining the program or the program information, in the storage step, a recording reservation operation for contents is controlled on the basis of the number of times of reproduction of contents, the restriction of display resolution at the time of reproduction of contents, and the expiration date of content reproduction described in the reproduction control information or, in the reproduction step, a reproduction operation is controlled on the basis of the number of times of reproduction of contents, the restriction of display resolution at the time of reproduction of contents, and the expiration date of content reproduction described in the reproduction control information.

14. A content recording and reproduction method according to claim 12, wherein in the storage step a reproduction for the received broadcast program is controlled based on record control data for managing a copy generation of contents in the control information or in the reproduction step recording reservation operation for the broadcast program is controlled based on record control data for managing a copy generation of contents in the control information, when the reproduction control information is not in the control information or the program information.

15. A non-transitory computer-readable medium storing a computer program that is described in a computer readable format so as to execute processing for receiving and reproducing broadcast contents in server type broadcasting on a computer system, comprising:
a reception step of receiving broadcast contents including a data stream for a broadcast program, control information for obtaining data for a broadcast program, program information, and content control information corresponding to the broadcast program or in the program information;
a storage step of storing the received broadcast contents; and
a reproduction step of reproducing the contents stored in the storage step, wherein
in the storage step, a recording reservation operation for the contents is controlled in accordance with the content control information or the program information, or in the reception step, a reproduction for the contents is controlled according to the content control information,
the content control information relating to copy control of the content and being in the control information for obtaining the program or in the program information,
the control information including information indicating identification numbers of data packets corresponding to a broadcast program, and
the program information including information about a broadcast program and broadcast time,
a server type broadcast content control descriptor is defined as copyright information at the time of content reproduction,
the content control descriptor being inserted in a program map table, and the applicability of the content control descriptor depending on the location of the content control descriptor within the program map tab table, such that in the case in which the descriptor is arranged in a first loop of the program map table the descriptor is applied to all elementary streams in a designated program, and when the descriptor is arranged in an elementary stream loop of the program map table the descriptor is applied only to a designated elementary stream.

16. A content distribution system according to claim 1, wherein the broadcast contents and the content control information are broadcasted by radio wave.

* * * * *